US006665482B2

United States Patent
Kawasaki et al.

(10) Patent No.: US 6,665,482 B2
(45) Date of Patent: Dec. 16, 2003

(54) OPTICAL FIBER AND OPTICAL TRANSMISSION LINE

(75) Inventors: Mitsuhiro Kawasaki, Tokyo (JP); Yohei Uchida, Tokyo (JP); Hiroaki Oonuma, Tokyo (JP)

(73) Assignee: The Furakawa Electric Co., Ltd., Tokyo (JP)

( * ) Notice: Subject to any disclaimer, the term of this patent is extended or adjusted under 35 U.S.C. 154(b) by 102 days.

(21) Appl. No.: 10/072,996

(22) Filed: Feb. 12, 2002

(65) Prior Publication Data

US 2002/0154876 A1 Oct. 24, 2002

(30) Foreign Application Priority Data

Feb. 16, 2001 (JP) ........................................ 2001-040663

(51) Int. Cl.$^7$ ............................. G02B 6/02; G02B 6/18; G02B 6/16
(52) U.S. Cl. ...................... 385/124; 385/123; 385/126; 385/127
(58) Field of Search ................................. 385/123, 124, 385/125, 126, 127, 128

(56) References Cited

U.S. PATENT DOCUMENTS 6,256,440 B1 * 7/2001 Kato et al. .................. 385/123
6,282,354 B1 * 8/2001 Jones et al. ................. 385/124
6,483,975 B1 * 11/2002 Hsu et al. ................... 385/123

OTHER PUBLICATIONS

Nouchi et al., "MAximum Effective Area for Non–Zero Dispersion–Shifted Fiber" Optical Communication Conference and Exhibit, 1998. OFC '98., Technical Digest, Feb. 22–27, 1998. pp. 303–304.*
K. Aikawa, et al., Proceedings of the 1999 Electronics Society Conference of IEICE, p. 183 (C–3–77) "Single–Mode Optical Fiber with Large Effective Core Area", Aug. 19, 1999.
T. Kato, et al., Proceedings of the 1999 Electronics Society Conference of IEICE, p. 182 (C–3–76) "Ultra Low Nonlinearity Low Pure Silica Core Fiber for Long–Haul WDM Transmission", Aug. 19, 1999.

* cited by examiner

Primary Examiner—Brian Healy
(74) Attorney, Agent, or Firm—Oblon, Spivak, McClelland, Maier & Neustadt, P.C.

(57) ABSTRACT

The optical fiber includes a center core portion, a side core portion and clad portion, which has a dispersion value of 14–20 ps/nm/km at a wavelength of 1550 nm, a dispersion slope of 0.05–0.08 ps/nm$^2$/km at a wavelength of 1550 nm and a transmission attenuation of 0.2 dB/km or less at a wavelength of 1550 nm, wherein the relative refractive index difference Δ1 between the center core portion and the clad portion is 0.25–0.50%, the relative refractive index difference Δ2 between the side core portion and the clad portion is 0.05–0.30%, an inequality Δ2<Δ1 is satisfied, the ratio a/b between an outer diameter a of the center core portion and an outer diameter b of the side core portion is 0.3–0.7, and the effective core area Aeff at a wavelength of 1550 nm is 90 $\mu m^2$ or larger.

4 Claims, 1 Drawing Sheet

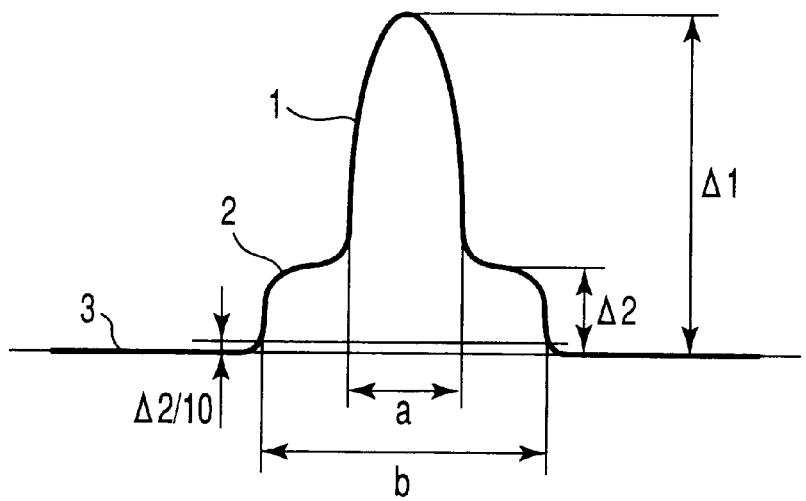
F I G. 1
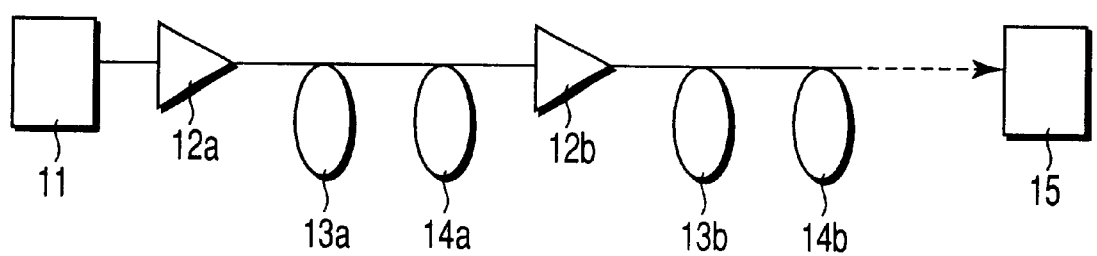
F I G. 2

OPTICAL FIBER AND OPTICAL TRANSMISSION LINE

CROSS-REFERENCE TO RELATED APPLICATIONS

This application is based upon and claims the benefit of priority from the prior Japanese Patent Application No. 2001-040663, filed Feb. 16, 2001, the entire contents of which are incorporated herein by reference.

BACKGROUND OF THE INVENTION

1. Field of the Invention

The present invention relates to an optical fiber and an optical transmission line used suitably in a wavelength division multiplexing (WDM) optical communications.

2. Description of the Related Art

As a technique for increasing the transmission capacity in the optical transmission using optical fibers, the WDM (wavelength division multiplexing) optical transmission has become a focus of attention recently, and many intensive studies have been conducted on optical fibers which are employed suitable in the WDM optical transmission.

Incidentally, well-known examples of the optical fiber which can be used for the WDM optical transmission are a single mode optical fiber (SMF) having a zero dispersion near a wavelength of 1.3 $\mu$m and a dispersion shift type optical fiber which does not have a zero dispersion in a wavelength band in use (NZDSF); however these types of optical fibers have a problem of non-linearity. Under these circumferences, there is a demand of developing a new type of optical fiber.

More specifically, in order to solve the problem of non-linearity, an optical fiber has been developed, in which the dispersion value is set fully away from zero and the effective core area Aeff is enlarged. Examples of such an optical fiber is discussed in Collection of Lecture Notes C-3-76 and C-3-77 for the Electronics Society Convention 1999 held by the Institute of Electronics, Information and Communication Engineers.

However, those types of optical fibers discussed in Lecture Notes C-3-76 and C-3-77, each exhibits a dispersion value of more than 20 ps/nm/km, and therefore the cumulative amount of dispersions of fibers when an optical transmission line is formed of these fibers, increases. With such an increased amount of dispersion, the transmission line cannot be appropriately used for a long-distance WDM optical transmission.

BRIEF SUMMARY OF THE INVENTION

An object of the present invention is to provide an optical fiber which has a dispersion value maintained at a similar level to that of the conventional SMF and is more suitable for the WDM optical transmission than the conventional SMF.

Another object of the present invention is to provide an optical transmission line comprising the above-described optical fiber, which is suitable for the WDM optical transmission.

According to an embodiment of the present invention, there is provided an optical fiber comprising a center core portion, a side core portion and a clad portion in an order from an inner side, which has a dispersion value of 14 ps/nm/km or higher and 20 ps/nm/km or less at a wavelength of 1550 nm, a dispersion slope of 0.05 ps/nm$^2$/km or higher and 0.08 ps/nm$^2$/km or less at a wavelength of 1550 nm and a transmission attenuation of 0.2 dB/km or less at a wavelength of 1550 nm, wherein a relative refractive index difference $\Delta 1$ between the center core portion and the clad portion is 0.25% or larger and 0.50% or less, a relative refractive index difference $\Delta 2$ between the side core portion and the clad portion is 0.05% or larger and 0.30% or less, an inequality $\Delta 2 < \Delta 1$ is satisfied, a ratio a/b between an outer diameter a of the center core portion and an outer diameter b of the side core portion is 0.3 or higher and 0.7 or less, and an effective core area Aeff at a wavelength of 1550 nm is 90 $\mu$m$^2$ or larger.

According to another embodiment of the present invention, there is provided an optical transmission line comprising a plurality of optical fibers, configured to transmit optical signals, wherein at least one of the plurality of optical fibers is the above-described optical fiber.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram schematically showing an example of the refractive index profile of an optical fiber according to an embodiment of the present invention; and FIG. 2 is a diagram schematically showing an optical transmission system comprising an optical fiber according to the embodiment of the present invention.

DETAILED DESCRIPTION OF THE INVENTION

Specific embodiments of the present invention will now be described with reference to accompanying drawings.

FIG. 1 is a diagram schematically showing an example of the refractive index profile of an optical fiber according to an embodiment of the present invention. FIG. 1 illustrates a refractive index profile 1 of a center core portion having an outer diameter a, a refractive index profile 2 of a side core portion having an outer diameter b, and a refractive index profile 3 of a clad portion.

As can be seen in FIG. 1, there is a maximum relative refractive index difference $\Delta 1$ between the center core portion 1 and the clad portion 3, and there is a relative refractive index difference $\Delta 2$ between the side core portion 2 and the clad portion 3.

It should be noted here that with regard to the optical fiber according to the embodiment, the relative refractive index difference $\Delta 2$ between the side core portion 2 and the clad portion 3 is defined as follows.

That is:

(1) In the case where there is no local maximum point of the refractive index in the side core portion 2, the relative refractive index difference $\Delta 2$ is taken by the value where the slope of the refractive index profile curve is at minimum.

(2) In the case where there is a local maximum point of the refractive index in the side core portion 2, the relative refractive index difference Δ2 is taken by the value of the relative refractive index difference between the local maximum point of the refractive index in the side core portion and the clad portion 3. Or in the case where there are a plurality of local maximum points of the refractive index, it is taken by the value of the relative refractive index difference between the maximum value of the local maximum points of the refractive index in the side core portion 2 and the clad portion 3. It should be noted here that there is a local minimum point when there is a local maximum point of the refractive index in the side core portion 2. Here, when the local minimum value of the relative refractive index differences (that is, the local minimum values of the refractive index) between the side core portion 2 and the clad portion 3 is 0.5 times or more as large as Δ2, the side core portion 2 is formed as one region.

Further, the border between the center core portion 1 and the side core portion 2 is defined at a point where when the curve of the refractive index profile of the center core portion 1 is approximated by an α curve, the α curve crosses with the line of the relative refractive index difference being zero. It should be noted that the α curve can be expressed by the following formula:

$$\Delta n(r) = \Delta n(0) \cdot \{1 - (2r/a)^\alpha\}$$

where Δn(r) represents the relative refractive index difference at a distance "r" from the center, Δn(0) represents the maximum relative refractive index difference, "a" represents the outer diameter of the center core portion and "r" represents the distance from the center.

Further, the border between the side core portion and the clad portion is defined at a point where the relative refractive index difference becomes 1/10 of the relative refractive index difference Δ2 between the side core portion and the clad portion, and a line extending in the direction where the relative refractive index difference changes crosses with the line of the relative refractive index difference being zero.

In the refractive index profile of the optical fiber according to the embodiment shown in FIG. 1, the relative refractive index difference Δ1 between the center core portion and the clad portion is 0.25% to 0.50%, and more preferably, it should be in a range of 0.33% to 0.40%. If the relative refractive index difference Δ1 is less than 0.25%, the dispersion value rises to 20 ps/nm/km or more, whereas if it exceeds 0.50%, Aeff drops to 90 μm² or less, which is not preferable.

The relative refractive index difference Δ2 between the side core portion and the clad portion is 0.05% to 0.30%, and more preferably, it should be in a range of 0.15% to 0.20%. If the relative refractive index difference Δ2 is less than 0.05%, bending attenuation becomes large, whereas if it exceeds 0.30%, cut-off wavelength exceeds 1550 nm, which is not preferable.

The relationship between Δ1 and Δ2 should be Δ2<Δ1, and if Δ2≧Δ1, desired properties are not obtained, which is not preferable.

In the optical fiber having a refractive index profile as described above, the ratio a/b between the outer diameter a of the center core portion and the outer diameter "b" of the side core portion should be in a range of 0.3 to 0.7, and more preferably it should be in range of 0.4 to 0.6. If the a/b ratio is less than 0.3, cut-off wavelength becomes large, whereas if it exceeds 0.7, bending attenuation becomes large, which is not preferable.

The effective core area Aeff at a wavelength of 1550 nm should be 90 μm² or more, and more preferably it should be 100 μm² or more. If the effective core area Aeff at a wavelength of 1550 nm is less than 90 μm², non-linear effect becomes prominent.

In the optical fiber according to the embodiment described above, the dispersion value at a wavelength of 1550 nm should be in a range of 14 ps/nm/km to 20 ps/nm/km, and more preferably it should be in a range of 14 ps/nm/km to 16 ps/nm/km. If it is tried to attain the dispersion value less than 14 ps/nm/km at a wavelength of 1550 nm, refractive index profile becomes complicate and productivity becomes worse, whereas if it exceeds 20 ps/nm/km, waveform is distorted, which is not preferable.

The dispersion slope at a wavelength of 1550 nm should be in a range of 0.05 ps/nm²/km to 0.08 ps/nm²/km, and more preferably it should be in a range of 0.05 ps/nm²/km to 0.07 ps/nm²/km. If it is tried to attain the dispersion slope less than 0.05 ps/nm²/km at a wavelength of 1550 nm, refractive index profile becomes complicate and productivity becomes worse, whereas if it exceeds 0.08 ps/nm²/km, transmission wavelength intervals must be widened, which is not preferable.

The transmission attenuation at a wavelength of 1550 nm should be 0.2 dB/km or less, and more preferably it should be 0.19 dB/km or less. If the transmission attenuation at a wavelength of 1550 nm exceeds 0.2 dB/km, distance between amplifiers becomes short, which is not preferable.

In order to achieve an optical fiber suitable for WDM optical transmission, it is necessary that the waveform distortion due to the four wave mixing should be suppressed, the distortion of the waveform due to the self phase modulation/cross-phase modulation should be suppressed and the distortion of the waveform due to dispersion should be suppressed.

The optical fiber according to the embodiment, which satisfies the above-described conditions, meets the above-described requirement and it is very much suitable for the WDM optical transmission. With use of the optical fiber, it is possible to obtain an optical transmission line suitable for the WDM optical transmission.

FIG. 2 is a diagram illustrating an optical transmission system including an optical transmission line with the optical fiber according to the embodiment of the present invention. FIG. 2 shows an optical transmitter 11, optical amplifiers 12a, 12b, . . . , positive dispersion optical fibers 13a, 13b, . . . , negative dispersion optical fibers 14a, 14b, . . . , such as DCFs, and an optical receiver 15.

The structure itself of the system shown in FIG. 2 is similar to that of the conventional system; however, a part of the system, specifically, optical fibers 13a, 13b, . . . , are of the fibers according to the embodiment of the present invention. With this structure, it becomes possible to remarkably improve the transmission properties. And then, it is possible to obtain an optical transmission line suitable for the WDM optical transmission.

Examples of the present invention will now be presented, and the invention will be explained in more detail.

EXAMPLES

The optical fiber having the refractive index profile shown in FIG. 1, was examined in terms of the change in properties at a wavelength of 1550 nm, when the parameters (Δ1, Δ2, a/b) were varied. It should be noted that the refractive index of the center core portion 1 was set such that it could be approximated with a curve of α=2 and the side core portion had no maximum points of the refractive index.

The outer diameter "b" of the side core portion 2 can be set in a range of 10 to 40 μm, and preferably it should be in a range of 18 to 30 μm. In this embodiment, the outer diameter "b" of the side core portion 2 was set to an optimal value within a range of 18 to 30 μm. It should be noted that the outer diameter "a" of the center core portion should preferably be in a range of 8 to 12 μm.

The results of the examination are presented in TABLE 1 below. In TABLE 1, the units for the values of Δ1 and α2 are in %, the unit for the dispersion value is in ps/nm/km, the unit for the dispersion slope is in ps/nm²/km, the unit for the transmission attenuation is in dB/km, the unit for Aeff is in μm². For reference, a cutoff wavelength λc (unit in nm) is presented as well in the table.

TABLE 1

|  | Δ1 | Δ2 | a/b | Dispersion value | Dispersion slope | Transmission attenuation | Aeff | λc |
| --- | --- | --- | --- | --- | --- | --- | --- | --- |
| Example 1 | 0.37 | 0.07 | 0.50 | 17.1 | 0.063 | 0.186 | 102 | 1320 |
| Example 2 | 0.36 | 0.05 | 0.43 | 17.0 | 0.062 | 0.184 | 97 | 1260 |
| Example 3 | 0.38 | 0.10 | 0.57 | 16.9 | 0.064 | 0.190 | 103 | 1460 |
| Comparative Example | 0.26 | 0.00 | — | 21.9 | 0.068 | 0.195 | 133 | 1580 |

As can be understood from TABLE 1 above, the optical fibers of Examples 1 to 3 each have a refractive index profile which is within the range defined by the present invention, and therefore they have the properties (the dispersion value is 20 ps/nm/km or less) suitable for the WDM optical transmission. By contrast, the optical fiber according to the comparative example has a refractive index profile which is out of the range defined by the present invention, and therefore its dispersion value exceeds 20 ps/nm/km. Further, its cutoff wavelength shifts to long wavelength side. Therefore, it is not suitable for the WDM optical transmission at a wavelength of near 1550 nm.

In the meantime, an optical transmission line was made of optical fibers according to Example 1 and line-type dispersion compensation optical fibers having such a length at which the dispersion can be substantially perfectly compensated. Of the optical fibers according to Examples 2 and 3 as well as that of Comparative Example, similar optical transmission lines were built. Then, the transmission test was carried out on these lines under conditions that an optical signal having 10 Gbps per wave was used as the WDM optical signal and 16 waves were arranged at the same intervals in a range of 1530 to 1560 nm in wavelength.

As a result, it was found that the optical transmission lines which were made of the optical fibers according to Examples 1 to 3 exhibited properties such as bit error rate of $10^{-9}$ or less, which are suitable for the WDM optical transmission, whereas the optical transmission line made of the optical fiber according to the Comparative Example exhibited bit error rate exceeding $10^{-9}$ and did not show suitable properties for the WDM optical transmission.

It should be noted here that the optical transmission line of the present invention is not limited to that discussed above, but can be remodeled into various versions. For example, the optical transmission line can be made of a dispersion compensation type fiber module in place of the line-type dispersion compensation optical fiber.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber comprising: a center core portion, a side core portion and clad portion in an order from an inner side, which has a dispersion value of 14 ps/nm/km or higher and 20 ps/nm/km or less at a wavelength of 1550 nm, a dispersion slope of 0.05 ps/nm²/km or higher and 0.08 ps/nm²/km or less at a wavelength of 1550 nm and a transmission attenuation of 0.2 dB/km or less at a wavelength of 1550 nm, wherein a relative refractive index difference Δ1 between the center core portion and the clad portion is 0.25% or larger and 0.50% or less, a relative refractive index difference Δ2 between the side core portion and the clad portion is 0.05% or larger and 0.30% or less, an inequality Δ2<Δ1 is satisfied, a ratio a/b between an outer diameter a of the center core portion and an outer diameter b of the side core portion is 0.3 or higher and 0.7 or less, and an effective core area Aeff at a wavelength of 1550 nm is 90 μm² or larger.

2. An optical fiber according to claim 1, wherein the relative refractive index difference Δ1 is in a range of 0.33% to 0.4%, the Δ2 is in a range of 0.15% to 0.2%, the ratio a/b between the outer diameter a of the center core portion and the outer diameter b of the side core portion is in range of 0.4 to 0.6, and the effective core area Aeff at a wavelength of 1550 nm is 100 μm² or larger.

3. An optical fiber according to claim 1, wherein the outer diameter b of the side core portion is in a range of 10 to 40 μm.

4. An optical transmission line comprising a plurality of optical fibers, configured to transmit an optical signal, wherein at least one of said plurality of optical fibers is an optical fiber according to claim 1.

* * * * *

UNITED STATES PATENT AND TRADEMARK OFFICE
CERTIFICATE OF CORRECTION

PATENT NO. : 6,665,482 B2
DATED : December 16, 2003
INVENTOR(S) : Kawasaki et al.

It is certified that error appears in the above-identified patent and that said Letters Patent is hereby corrected as shown below:

Title page,
Item [73], Assignee, should read
-- [73]   Assignee:   The Furukawa Electric Co., Ltd.,
                      Tokyo (JP) --

Signed and Sealed this

Twenty-fifth Day of January, 2005

JON W. DUDAS
*Director of the United States Patent and Trademark Office*